United States Patent [19]

Tuhkanen

[11] Patent Number: 4,838,580
[45] Date of Patent: Jun. 13, 1989

[54] COMBINED VISITING CARD AND BROCHURE

[75] Inventor: Tapio Tuhkanen, Turku, Finland

[73] Assignee: Office Plus, Turku, Finland

[21] Appl. No.: 137,784

[22] Filed: Dec. 23, 1987

[51] Int. Cl.⁴ .................. G09F 3/00; B42D 15/00; B41L 1/24; B65D 27/00

[52] U.S. Cl. .................. 283/56; 283/67; 282/25; 229/68 R

[58] Field of Search .......... 283/67, 68, 101, 56; 229/68 R, 76; 493/186; 156/44; 282/25

[56] References Cited

U.S. PATENT DOCUMENTS

| 689,681 | 12/1901 | Meadows | 229/68 |
|---|---|---|---|
| 1,423,653 | 7/1922 | Eickoff | 229/68 |
| 1,682,167 | 8/1928 | Deutschmeister | 229/68 |
| 2,279,164 | 4/1942 | Gettleman | 283/56 |
| 2,580,886 | 1/1952 | Broudy | 229/68 |
| 2,616,612 | 11/1952 | Guttman | 283/56 |
| 4,502,713 | 3/1985 | Conti | 282/25 |
| 4,516,793 | 5/1985 | Iciyokane | 282/25 |
| 4,531,993 | 7/1988 | Bradley | 282/25 |

Primary Examiner—Frank T. Yost
Assistant Examiner—Paul M. Heyrana, Sr.
Attorney, Agent, or Firm—Herbert Dubno

[57] ABSTRACT

Combined visting card and brochure folded from a single sheet into the size and shape of a visting card and held in that condition by glued together tabs. A panel of that sheet printed with contact information can be separated along perforated lines form the remainder of the sheet which is imprinted with legible matter and illustrations descriptive of goods or services.

6 Claims, 3 Drawing Sheets

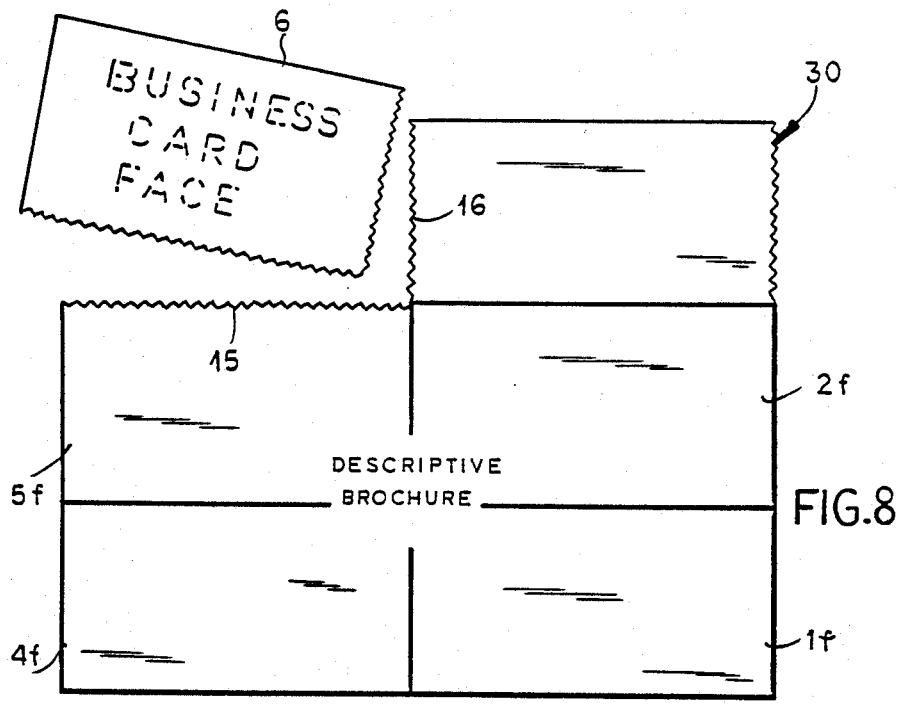

COMBINED VISITING CARD AND BROCHURE

FIELD OF THE INVENTION

My present invention relates to a combined visiting card and brochure and, more particularly, to a folded unit which is substantially the size of a standard business card but which can be opened to reveal a brochure sheet from which a visiting card, business card or the like can be removed.

BACKGROUND OF THE INVENTION

It is well known to provide a brochure to which a visiting card may be attached, e.g. by a staple or any other way, so that the viewer, after considering the product offered by the brochure, can contact the individual whose visiting or business card has been attached to the brochure.

Staples for such purposes are awkward and frequently the visiting card obscures some aspect of the face of the brochure. In general the unit is not compact and is neither conveniently handled or stored and certainly cannot be placed in a pocket of the receiver for subsequent review in any convenient manner.

OBJECTS OF THE INVENTION

It is, therefore, the principal object of this invention to provide a combined business card (or visiting card) and brochure (or leaflet) which obviates the above-mentioned drawbacks.

Another object is to provide a unit including a business card and brochure which is compact, readily transmitted through the mails, can be used as an insert in mailings and packaging and can be conveniently handled to an interested party who can with equal convenience carry and review the leaflet.

It is another object of this invention to provide a unit which can be conveniently carried in the pocket of an interest party for subsequent review or in a pocket or holder of a sales person or manufacturer's representative for ready distribution and which will, at the same time, provide details of a product and service without size limitation and yet provide a business or visiting card of conventional size permitting subsequent contact.

SUMMARY OF THE INVENTION

These objects and others which will become apparent hereinafter are attained, in accordance with the present invention, in a business card and brochure unit which comprises a folded paper sheet having at a corner thereof, a rectangular panel which is connected to the remainder of the sheet by perforations or score lines, i.e. means affording clean separation of the panel from the balance of the sheet. This panel is of the size of a conventional business card and according to the invention, the sheet is treated with fold lines so that the entire sheet can be folded into a rectangle of similar size with the card-forming panel constituting an outer member of the folded structure.

Opposite edges of the folded sheet are formed with tabs, likewise readily separable from the sheet, i.e. provided with perforations or scoring as described, which can be joined together by an adhesive to hold the sheet in its folded form. Advantageously, one such tab is located along a short edge of the rectangular panel forming the business card.

The balance of the sheet can be provided with descriptive material, e.g. legible matter and illustrations in a monocolor or multicolor format on both its face (obverse) or reverse sides. Similarly, the panel forming the business card may be imprinted on both its obverse side and its reverse side with contact information, the obverse side being initially found within the folded unit but being exposed when, after the tabs are removed, the sheet can be unfolded and the card-forming panel separated therefrom.

Preferably, the sheet is formed with fold lines defining six panels of similar size and rectangular configuration.

BRIEF DESCRIPTION OF THE DRAWING

The above and other objects, features and advantages of the present invention will become more readily apparent from the following description, reference being made to the accompanying drawing in which:

FIG. 3 is a similar view illustrating a further folded state;

FIG. 4 is a section taken along the line IV—IV of FIG. 3;

FIG. 8 is a view similar to FIG. 7 but illustrating the removal of the business card panel from the unit.

SPECIFIC DESCRIPTION

Figure 1:
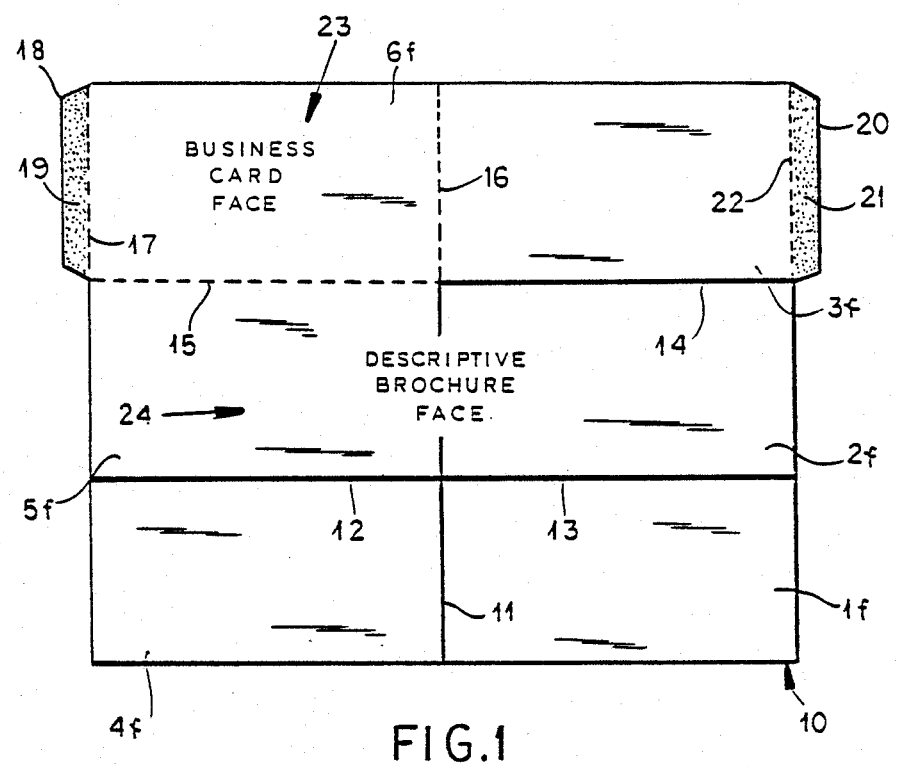
FIG. 1 is a face view of the sheet of the present invention prior to the folding thereof.

In FIG. 1 I have shown a sheet 10 which comprises six panels 1f–6f (f representing the face of the panel). When the reverse of each panel is visible, it will be designated by the same reference numeral followed by the letter r.

The panels are separated by fold lines 11, 12, 13 and 14 and all are rectangular and substantially of the size of a conventional business card, visiting card or calling card.

The business card panel 6f is separated from the balance of the sheet by a score line or row of perforations 15 along one longitudinal side of this panel and a score line or row of perforations 16 along one narrow side so that it is disposed at a corner of the sheet.

In addition, the other short side of the card-forming panel 6f is separated by a score line 17 from a tab 18 which has a surface 19 which can provide that layer of glue or otherwise adhesively bonded to a tab 20 having a corresponding gluable surface 21 and separated by a score line or row of perforations 22 from the panel 3f along the opposite edge of the sheet.

The business card panel 6f may have, on its obverse legible matter illustrated only diagrammatically at 23 and of a type which can be conveniently provided on a business card, e.g. giving the name of an individual to be contacted, the name of a company, an address, a telephone number or some other telecommunication data.

Similarly, the remaining panels 1f–5f can be imprinted with legible matter and illustrations represented at 24 describing a product or service.

The rear side of the sheet may be similarly imprinted or imprinted with different information and the reverse of the business card panel 6r may also be imprinted with contact information.

The panels 1f-5f and the reverse sides thereof may form fields with different information or may form a common field spanned by information.

Figure 2:
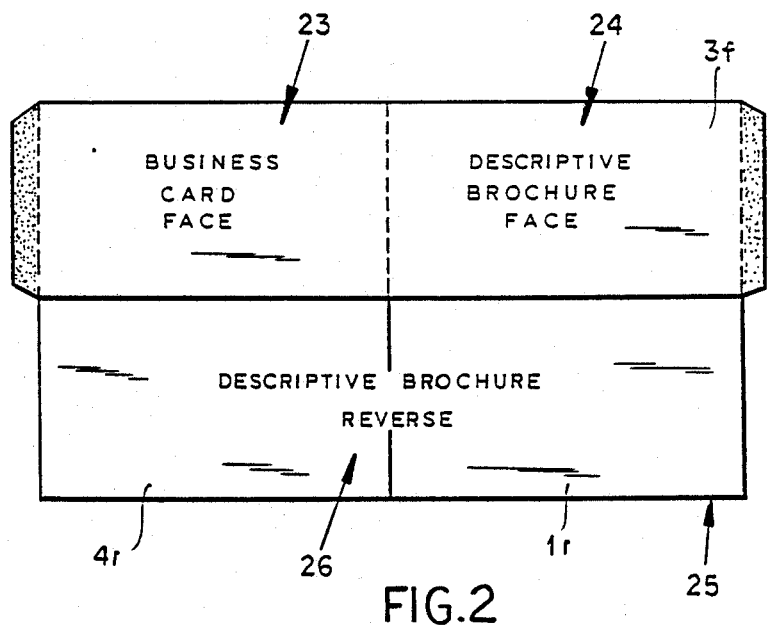
FIG. 2 shows an initial stage of folding the sheet of FIG. 1 to the compact card size unit of the invention.

For use, the sheet 10 shown in FIG. 1 is folded and to that end, the panels 1f and 4f can be folded up along the fold lines 12 and 13 to form the intermediate unit 25 seen in FIG. 2. As a consequence, the panel surfaces 1r and 4r are now visible with the descriptive matter 26 on the reverse of the sheet, although at penel 3f the obverse descriptive matter 24 remains visible as does the business card legible matter 23.

Figure 5:
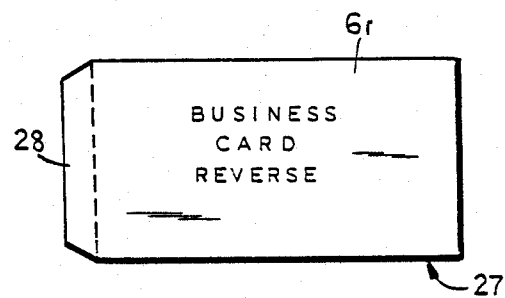
FIG. 5 is a rear view of the unit in which the reverse side of the card-forming panel is visible.

The unit is then folded again to assume the position seen in FIG. 3 at 26 about the perforated line 15 and the fold line 14. The panel surfaces 2r and 5r then become visible and, upon folding about the fold lines 11 and 13 and the perforated line 16, the tabs 18 and 20 are brought together and attached by an adhesive, e.g. glue or a pressure-sensitive adhesive to form the unit shown at 27 in FIG. 5 with the two tabs 18 and 20 forming a means 28 retaining the sheet its folded position.

The business card reverse 6r is then visible on one side and, of course, the reverse of panel 1f can be seen on the opposite side and will have at least some of the information printed on the reverse of the sheet visible to a viewer. The unit 27 is approximately of business-card size and may be handed out easily and conveniently and may be received with equal ease to be stored, for example, in a pocket such as a shirt pocket, a coat pocket, or a conventional pocket of a business-card holder.

Figure 6:
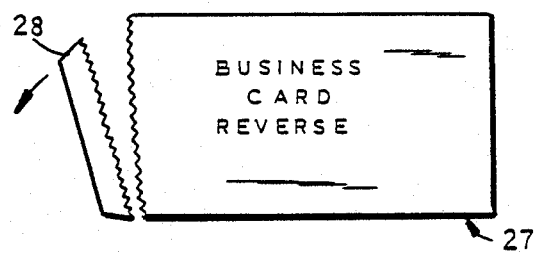
FIG. 6 illustrates diagrammatically the separation of the glued-together tabs to permit unfolding of the unit.
Figure 7:
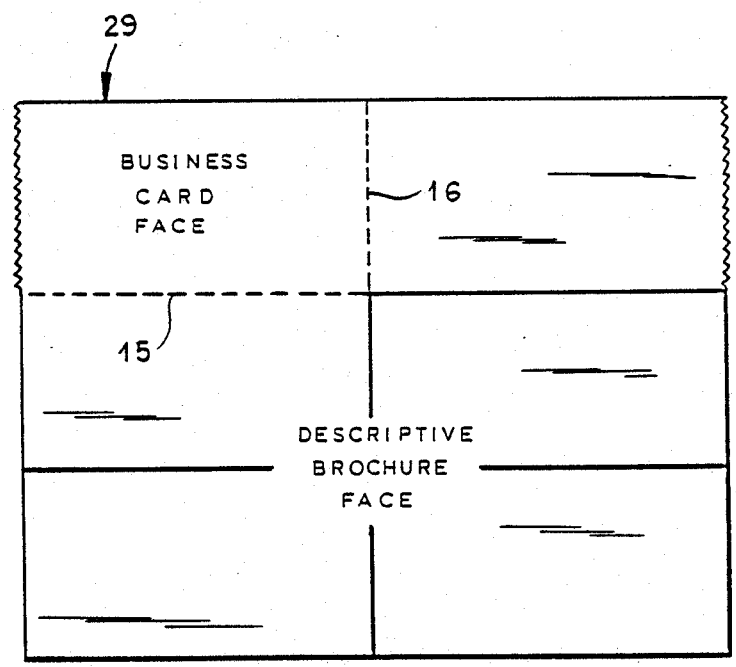
FIG. 7 is a view similar to FIG. 1 showing the unit in its unfolded state.

When the receiver is interested in reviewing the contents of the brochure, he need merely tear the joined tabs 28 from the unit 27 as shown in FIG. 6 so that the resulting folded packet 28 can now be unfolded to provide the sheet as it has been illustrated at 29 in FIG. 7. From this sheet, along the perforated lines 15 and 16, the business card 6 can be torn (compare FIGS. 7 and 8) leaving the remainder 30 of the brochure available to describe the products and services. The business card 6 is rectangular and of standard business card size, e.g. 5 cm×9.5 cm.

I claim:

1. A combined business card and brochure unit which comprises:

a flexible sheet formed with a separable panel connected by ready-separation means to the remainder of said sheet and having the shape and dimensions of a business card and provided with business contact information at least along one face of said panel, said sheet being further formed with fold lines enabling the remainder of said sheet to be folded into a folded state substantially the size and shape of said panel, said sheet being formed along opposite edges with tabs which overlie one another in said folded state and which are adhered to one another to retain said sheet in said folded state, said tabs being joined to said sheet by respective ready-separation lines permitting the joined tabs to be removed from said unit and said sheet to be unfolded so that said panel can then be removed from said sheet to form a business card separate from said sheet, said remainder of said sheet being provided with descriptive literature, said panel being provided at a corner of said sheet and having a short side along which one of said tabs is attached to said panel and another short side and one long side provided with said ready-separation lines.

2. The unit defined in claim 1 wherein said panel is imprinted on opposite faces thereof with contact information.

3. The unit defined in claim 2 wherein said remainder of said sheet is imprinted on opposite faces thereof with descriptive information.

4. The unit defined in claim 3 wherein said fold lines define six rectangular fields on said sheet, one of which forms said panel and include a central fold line between said opposite edges and a pair of transverse fold lines, a field opposite side panel across said central fold line being provided with the other of said tabs.

5. The unit defined in claim 4 wherein one of said tabs is provided with an adhesive and is glued to the other of said tabs.

6. A method of providing information with respect to goods or services and contact information as to the availability thereof which comprises:

(a) forming a unit which comprises a flexible sheet formed with a separable panel connected by ready-separation means to the remainder of said sheet and having the shape and dimensions of a business card and provided with business contact information at least along one face of said panel, said sheet being further formed with fold lines enabling the remainder of said sheet to be folded into a folded state substantially the size and shape of said panel, said sheet being formed along opposite edges with tabs which overlie one another in said folded state and which are adhered to one another to retain said sheet in said folded state, said tabs being joined to said sheet by respective ready-separation lines permitting the joined tabs to be removed from said unit and said sheet to be unfolded so that said panel can then be removed from said sheet to form a business card separate from said sheet, said remainder of said sheet being provided with descriptive literature, said panel being provided at a corner of said sheet and having a short side along which one of said tabs is attached to said panel;

(b) folding said remainder of said sheet so that fields thereof between said fold lines overlie said panel and attaching said tabs together to form a folded product with the folded state held by the connected tabs;

(c) distributing said compact product for review of information on said unit;

(d) tearing the joined tabs from the balance of the product and unfolding said sheet; and (e) tearing said panel from said remainder of said sheet along the easy separation lines connecting said panel to said remainder of said sheet to form a business card from said panel.

* * * * *